US00RE46018E

(19) United States
(12) Reissued Patent
Hoppe et al.

(10) Patent Number: US RE46,018 E
(45) Date of Reissued Patent: May 31, 2016

(54) DISPERSE AZO DYE MIXTURES

(71) Applicant: DyStar Colours Distribution GmbH, Raunheim (DE)

(72) Inventors: Manfred Hoppe, Kurten (DE); Kiyoshi Himeno, Fukuoka (JP); Ryouichi Sekioka, Fukuoka (JP)

(73) Assignee: DyStar Colours Distribution GmbH, Raunheim (DE)

(21) Appl. No.: 14/152,364

(22) Filed: Jan. 10, 2014

Related U.S. Patent Documents

Reissue of:
(64) Patent No.: 6,121,352
Issued: Sep. 19, 2000
Appl. No.: 09/271,820
Filed: Mar. 18, 1999

(30) Foreign Application Priority Data

Mar. 23, 1998 (DE) ..... 198 12 615
Apr. 9, 1998 (DE) ..... 198 16 056

(51) Int. Cl.
*C09B 67/00* (2006.01)
*C09B 67/22* (2006.01)

(52) U.S. Cl.
CPC ..... *C09B 67/0051* (2013.01); *Y10S 8/921* (2013.01); *Y10S 8/922* (2013.01); *Y10S 8/924* (2013.01)

(58) Field of Classification Search
CPC ..... C09B 67/0051; Y10S 8/922; Y10S 8/921; Y10S 8/924
USPC ..... 524/190; 8/524, 527, 532, 533, 639, 8/662, 696, 921, 922, 924
See application file for complete search history.

(56) References Cited

U.S. PATENT DOCUMENTS

| | | | | |
|---|---|---|---|---|
| 4,359,322 | A | 11/1982 | Neal et al. | |
| 4,795,807 | A | 1/1989 | Bühler et al. | 524/58 |
| 5,019,133 | A | 5/1991 | Himeno et al. | |
| 5,174,792 | A | 12/1992 | Tsumura et al. | 8/639 |
| 5,393,308 | A | 2/1995 | Lange et al. | |

FOREIGN PATENT DOCUMENTS

| | | | |
|---|---|---|---|
| CN | 1036974 | A | 11/1989 |
| DE | 229422 | | 11/1985 |
| DE | 229422 | C | 11/1985 |
| EP | 0575802 | A1 | 12/1993 |
| EP | 0729069 | A1 | 8/1996 |
| EP | 0738931 | A2 | 10/1996 |
| EP | 0778497 | A1 | 6/1997 |
| GB | 2030169 | | 4/1980 |
| GB | 2030169 | A | 4/1980 |
| GB | 1582743 | | 1/1981 |
| GB | 1582743 | A | 1/1981 |
| JP | 60-015460 | | 1/1985 |
| WO | WO-99/51690 | A1 | 10/1999 |

OTHER PUBLICATIONS

Chemical Abstract, vol. 114 (1991), p. 101, Abstract No. 145436d.
CN-1 1 036 974, Preparing N-cyanoethyl-N-benzylaniline derivatives for disperse azo dyes, 1989.
"Exhibit 1" *Handbook of Chemical Engineering Products, Dyes and Organic Pigments*, 2nd Ed., Jan. 1995, pp. 480, 478 and 587 (note pp. 578 and 579 of this handbook are on record already (See Reissue Petition).
"Exhibit 1 Complete" *Handbook of Chemical Engineering Products, Dyes and Organic Pigments*, 2nd Ed., Jan. 1995, pp. Cover page, 8, 464-471, 474-481, 484, 485, 488, 489, 502, 503, 510, 511, 516, 517, 522, 523, 536, 542, 547-551, 554, 555, 560, 561, 564, 565, 568, 571, 574, 581, 594, 595.
"Exhibit 2" *Journal of East China Institute of Chemical Technology*, vol. 1, 1988, pp. 59-63.
"Exhibit 3" CN 1036974A (CAS abstract of which is on record already (See Reissue Petition), 1989.
"Exhibit 4" CN 1085924A (equivalent to USP 5,393,308), 1994.
"Exhibit 5" "Dyestuff Industry," vol. 4, 1989, pp. 48-49.
"Exhibit 6" Foris, Anthony, *The Analytical Chemistry of Synthetic Dyes*, Dec. 1985 (chapter on NMR spectroscopy of synthetic dyes).
"Exhibit 7" *Dyeing and Finishing Technology*, China Textile Publishing House, Jul. 2001.
"Exhibit 8" *Dye Application Handbook*, China Textile Publishing House, Apr. 1994.
"Exhibit 9" Dye Application Handbook.
"Exhibit 10" Ranliao, Fensan [title of publication unknown].
Shade Card on Foronschwarz RD-3G 300 from Sandoz, Sep. 17, 1997.

(Continued)

*Primary Examiner* — Dwayne Jones
(74) *Attorney, Agent, or Firm* — Drinker Biddle & Reath LLP

(57) ABSTRACT

The present invention relates to dye mixtures comprising at least one compound of the formula (I)

(I)

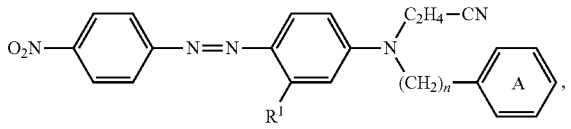

and at least one compound of the formula (II)

(II)

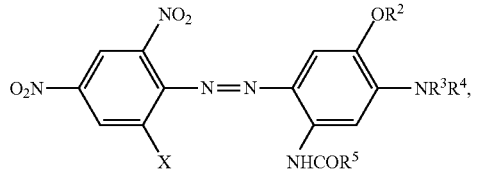

where the substituents are each as defined in the description part, which are highly useful for dyeing and printing hydrophobic synthetic material.

9 Claims, No Drawings

(56) References Cited

OTHER PUBLICATIONS

Chemical Engineering Product Handbook—Dyes Organic Pigments, 2nd ed. 1995, pp. 578 and 579 (Chinese original and English translation enclosed).
Exhibit 19,: Griesser, W., Clariant (Schweiz) AG, Alkaline dyeing of polyester fibres, pp. 1-8, 1996.
"Exhibit 18," Christen, H.R., et al., Organic Chemistry, From the basics to research, vol. 1, pp. 1-5, 1988.
"Exhibit 1," Handbook of Chemical Products, Dyes-Organic Pigments, 2nd Ed. Dyestuff Industry Science and Technology Information Centre of the Ministry of Chemical Industry, Chemical Industry Press, Beijing, 1995.
Decision of Technical Board of Appeal 3.3.01, dated Mar. 4, 2008, Case No. T 1701/06-3.3.01, regarding revocation of EP0945493.
Decision of Technical Board of Appeal 3.3.01 dated Nov. 9, 2005, Case No. T0005/05-3.3.01, regarding revocation of EP0945493.
Facts and Requests dated Sep. 18, 2006, regarding European Application No. 99104880.2, pp. 1-6.
Facts and Requests dated "CodingDate", regarding European Application No. 99104880.2, pp. 1-5.
PubMed abstract of G. de Aragao Umbuzeiro et al., Food Chem. Toxicol., vol. 43, No. 1, Jan. 2005, 49-56.

DISPERSE AZO DYE MIXTURES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The invention relates to disperse azo dye mixtures, processes for their preparation and to their use for dyeing and printing hydrophobic synthetic materials.

It is an object of the present invention to provide navy to black disperse dye mixtures having good application properties.

The invention accordingly provides a dye mixture comprising at least one dye of the formula (I)

(I)

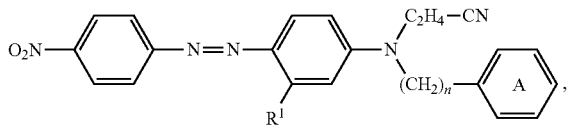

where $R^1$ is hydrogen, $C_1$-$C_4$alkyl, halogen, especially Cl and Br, or $C_1$-$C_4$-alkoxy, n is 1 or 2, and the ring A is optionally substituted, possible substituents being one or more identical or different substituents, preferably $C_1$-$C_4$-alkyl, especially $CH_3$, and also halogen, especially Cl and Br, and at least one dye of the formula (II)

(II)

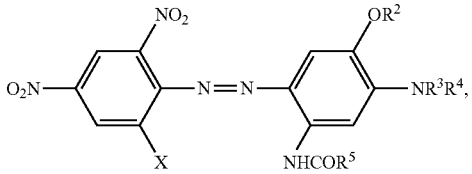

where

X is halogen, especially Cl and Br, or CN, $R^2$ and $R^5$ are independently hydrogen or $C_1$-$C_4$-alkyl, and $R^3$ and $R^4$ are independently hydrogen, optionally substituted $C_1$-$C_4$-alkyl or $C_2$-$C_4$-alkenyl, possible substituents for alkyl being preferably selected from —OH, —CN, —OCOR, —$OCOC_6H_5$, —OCOOR, —COOR, —$OC_6H_5$, —$C_6H_5$ and/or $C_1$-$C_4$-alkoxy, R being hydrogen or $C_1$-$C_4$-alkyl.

Dyes of the formula (I) are known for example from CN-A-1 036 974 (=CA 114: 145 436) and dyes of the formula (II) for example from DE-A-2 818 653.

Preferred mixtures contain compounds of the formula (I) where the ring A does not bear any further substituents. Particular preference is given to compounds of the formula (I) where $R^1$ is hydrogen or $C_1$-$C_4$-alkyl, especially methyl. Very particular preference is given to mixtures of the invention which comprise the dye of the formula (I) where n is 1, $R^1$ is hydrogen or methyl, and the ring A is not further substituted.

Preferred mixtures contain a dye of the formula (II) where X is halogen, especially Cl or Br. Particularly preferred dyes of the formula (II) are those where $R^3$ and $R^4$ are independently hydrogen, $C_2$-$C_4$-alkenyl, unsubstituted $C_1$-$C_4$-alkyl or ROCO—, NC— or ROOC-substituted $C_1$-$C_4$-alkyl, R being as defined above.

In particular, in the formula (II), $R^2$ and $R^5$ are independently $C_1$-$C_4$-alkyl, preferably $CH_3$.

Particularly preferred mixtures according to the invention are those which contain at least one dye of the formula (I) selected from the group:

(Ia)

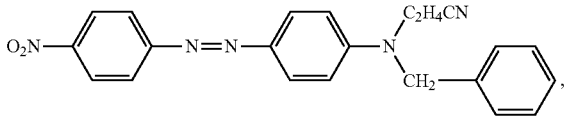

(Ib)

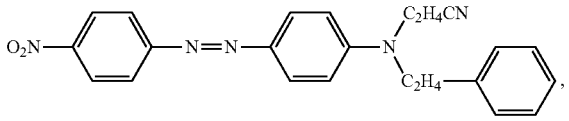

(Ic)

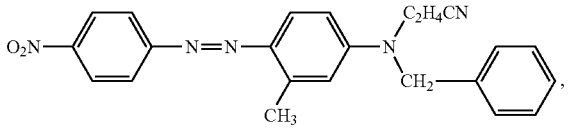

and at least one dye of the formula (II) selected from the group:

(IIa)

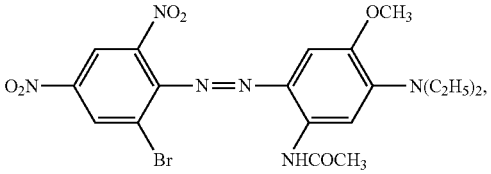

(IIb)

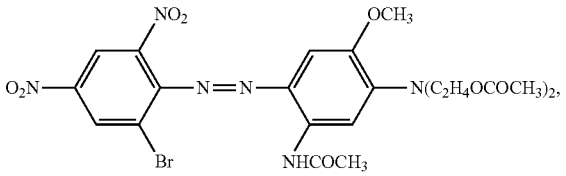

(IIc)

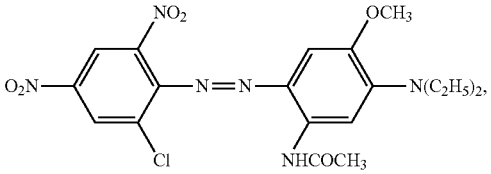

(IId)

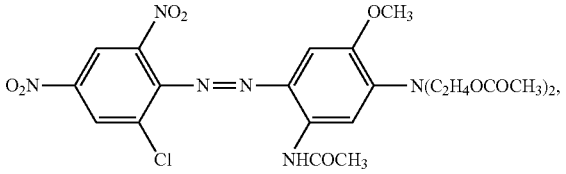

-continued (IIe)

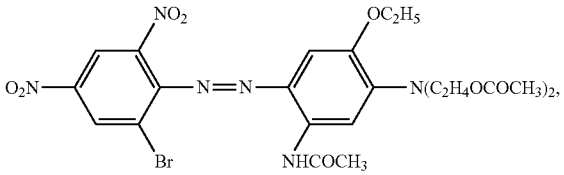

(IIf)

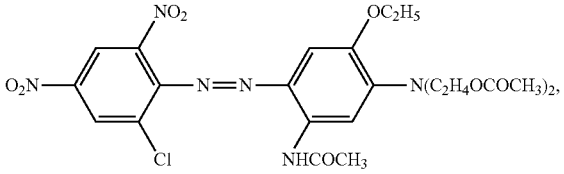

(IIg)

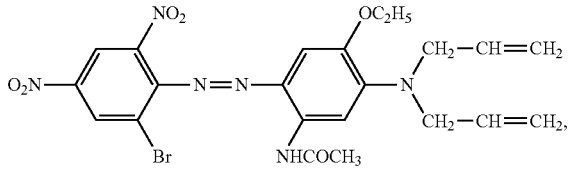

(IIh)

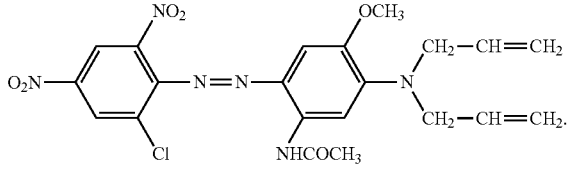

Preference is further given to mixtures of the invention which additionally contain a further dye of the formula (III), (IV) and/or (V)

(III)

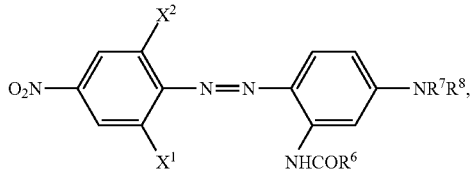

(IV)

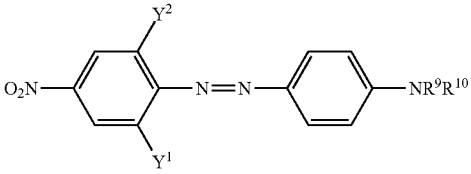

and/or (V)

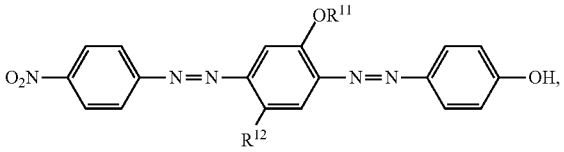

where $X^1$ is halogen, especially Cl and Br, or CN, $X^2$ is halogen, especially Cl and Br, hydrogen, $NO_2$ or CN, $R^6$ is $C_1$-$C_4$-alkyl, $R^7$ and $R^8$ are independently hydrogen, unsubstituted or HO—, NC—, ROCO—, $H_5C_6OCO$—, ($C_1$-$C_4$-alkyl) OOCO—, ROOC—, $H_5C_6O$—, $H_5C_6$- and/or $C_1$-$C_4$-alkoxy-substituted $C_1$-$C_4$-alkyl or $C_2$-$C_4$-alkenyl, R being as defined above, $Y^1$ and $Y^2$ are independently hydrogen or halogen, especially Cl and Br, $R^9$ and $R^{10}$ are independently hydrogen, unsubstituted or HO—, NC—, ROCO—, $H_5C_6OCO$— and/or $C_1$-$C_4$-alkoxy-substituted $C_1$-$C_4$-alkyl, R being as defined above, or $C_2$-$C_4$-alkenyl, $R^{11}$ is $C_1$-$C_4$-alkyl, and $R^{12}$ is hydrogen, $C_1$-$C_4$-alkyl or $C_1$-$C_4$-alkoxy.

Particularly preferred mixtures are those which, as well as the dyes of the formulae (I) and (II), contain a dye of the formula (III), in particular dyes of the formula (III) selected from the group (IIIa) and (IIIb):

(IIIa)

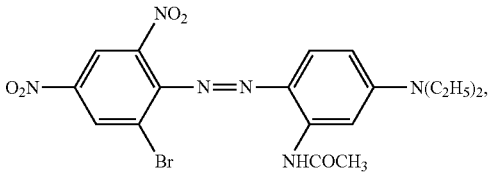

(IIIb)

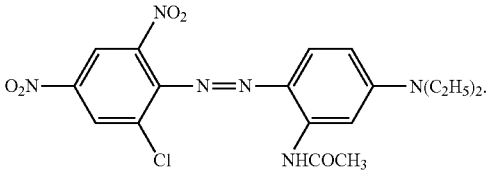

Likewise particularly preferred mixtures are those which, as well as the dyes of the formulae (I) and (II), contain a dye of the formula (IV), in particular dyes of the formula (IV) selected from the group (IVa), (IVb) and (IVc)

(IVa)

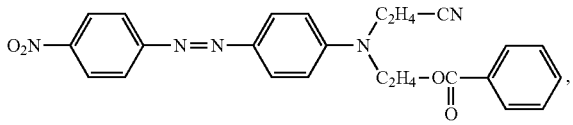

(IVb)

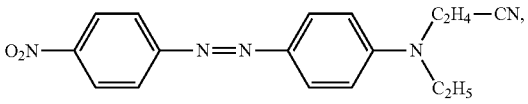

(IVc)

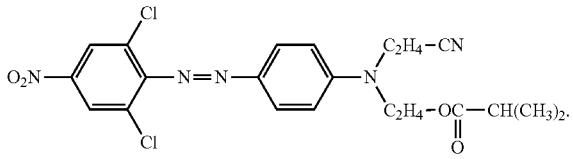

Particularly preferred mixtures further includes those which, as well as the dyes of the formulae (I) and (II), contain a dye of the formula (V), especially the dye of the formula (Va)

(Va)

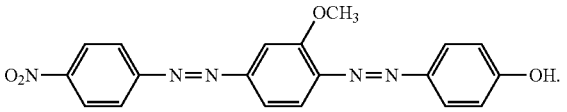

The dye mixture of the invention preferably comprises 1 to 99%, preferably 1 to 80%, especially 5 to 60%, by weight of at least one dye of the formula (I) and 1 to 99%, preferably 20 to 99%, especially 40 to 95%, by weight of at least one dye of the formula (II), based on the total amount of dye.

Preference is given to using the dye of the formula (III) in an amount of 0 to 80%, especially 2 to 60%, by weight, based on the total amount of dye.

Preference is given to using the dye of the formula (IV) in an amount of 0 to 40%, especially 5 to 30% by weight, based on the total amount of dye.

Preference is given to using the dye of the formula (V) in an amount of 0 to 40%, especially 5 to 30% by weight, based on the total amount of dye.

The dye mixtures of the invention lead to black to navy shades, especially with the above-specified mixing ratios.

The mixtures of the invention are especially notable for excellent sublimation fastness and good affinity. Also, the colour yield is consistently high over a wide pH range. They are especially useful for alkaline polyester dyeing, especially at a pH of 8 to 11.

The dye mixture of the invention may include further disperse dyes.

The invention further relates to a process for producing the dye mixture of the invention, characterized in that the individual dyes (I) and (II) and optionally further dyes of the dye mixture are ground in water in the presence of a dispersant, then mixed and optionally dried or in that the dyes (I), (II) and optionally further ones are mixed, ground in water in the presence of a dispersant and optionally dried.

Novel dye mixtures of the dyes of the formulae (I), (II) and optionally one or more dyes of the general formulae (III) to (V) can be prepared for example by simply mixing the components. The mixing can be accomplished by mixing separately finished individual components in the dyeing liquor or else, preferably, by mixing the press cakes of the individual components and conjointly finishing the mixture.

The finish is characterized in that the dyes are ground in the presence of a dispersant to convert them into an aqueous dispersion, i.e. into a liquid or, after drying, into a pulverulent dye preparation, for which the individual dyes can first be separately finished and then mixed or the individual dyes can first be mixed and then conjointly finished. This grinding preferably takes place in mills, for example ball, vibratory, bead or sand mills, or in kneaders. After grinding, the dye particle size is preferably about 0.1 to 10 μm, especially about 1 μm. The grinding preferably takes place in the presence of dispersants, which can be nonionic or anionic. Nonionic dispersants are for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example ligninsulphonates and salts thereof, alkyl- or alkylarylsulphonates, alkylaryl polyglycol ether sulphates, alkali metal salts of the condensation products of naphthalenesulphonic acids and formaldehyde, polyvinyl sulphonates and ethoxylated novolaks.

The invention therefore also provides dye preparations comprising 10 to 60% by weight of the dye mixture of the invention, and 40 to 90% by weight of the dispersant.

The dye preparations can be present in liquid or solid form, in which case the liquid preparations are preferably aqueous dye dispersions and the solid preparations are present as powder or granules.

Preferred aqueous dye preparations comprise water, 15 to 50% by weight of the dye mixture of the invention, and 10 to 25% by weight of dispersant, each based on the dye preparation.

Preferred dispersants are the abovementioned nonionic and anionic dispersants.

The dye preparations of the invention may comprise further auxiliaries, for example auxiliaries which act as oxidizing agents, e.g. sodium m-nitrobenzenesulphonate, or fungicidal agents, e.g. sodium o-phenylphenoxide and sodium pentachlorophenoxide. It is also possible for wetting agents, antifreeze agents, dustproofing agents or hydrophilicizing agents to be included.

For certain applications, solid preparations such as powder or granule preparations are preferred. Preferred solid dye preparations comprise 30 to 50% by weight of the dye mixture of the invention, and 70 to 50% by weight of the dispersant.

They may optionally further comprise auxiliaries, for example wetting, oxidizing, preserving and dustproofing agents.

A preferred process for producing the solid preparations consists in depriving the above-described liquid dye preparations of their liquid, for example by vacuum drying, freeze drying, by drying on drum dryers, but preferably by spray drying.

Dye mixtures of the invention, however, can preferably also be produced by conjoint finishing of the mixing components.

To this end, the mixing components are dispersed in a suitable mixing ratio as described above by a grinding operation in water and optionally converted into a solid dye preparation by removing the water.

To improve the properties of the dye preparations, it can be advantageous to subject the mixing components to a heat treatment prior to grinding. The heat treatment takes place at 25 to 98° C., preferably at 30 to 80° C., particularly preferably at 40 to 60° C. It is advantageous to carry out the finishing, i.e. the conversion into the commercially customary solid or liquid preparations, immediately after the heat treatment, without intermediary isolation. For this purpose, the heat-treated suspension is converted into a dispersion by grinding. It is advantageous in this connection to carry out the heat treatment in the presence of those dispersants and optionally also auxiliaries which are to be included in the finished solid or liquid preparation. These are identical with the abovementioned surface-active substances. If the total amount of these dispersants and auxiliaries was not added during the heat treatment, the remainder will be added prior to grinding. In this case, generally 10 to 400% by weight, preferably 20 to 200% by weight, of surface-active substances, based on the dye mixtures, are added for the heat treatment.

To produce dyeing liquors, the requisite amounts of the dye preparations produced in accordance with the above directions are diluted with the dyeing medium, preferably water, to such an extent that a liquor ratio of 5:1 to 50:1 is obtained for the dyeing. In addition, the liquors generally have added to them further dyeing auxiliaries, such as carriers, dispersants and wetting agents.

If the dye mixture of the invention is to be used for textile printing, then the requisite amounts of the dye preparation are kneaded, preferably together with thickeners, for example alkali metal alginates or the like, optionally further additives, for example fixation accelerants, wetting agents and hydration agents, to form print pastes.

The dye mixtures of the invention, which incidentally may include further dyes, are very useful for dyeing and printing hydrophobic synthetic materials. Examples of suitable hydrophobic synthetic materials are cellulose acetate, cellulose triacetate, polyamides and high molecular weight polyesters. The dye mixtures of the invention are preferably used for dyeing and printing materials composed of high molecular weight polyesters, especially those based on polyethylene glycol terephthalates, or their mixtures with natural fibre materials, especially wool or cellulose, or for dyeing and printing materials composed of cellulose triacetate.

The hydrophobic synthetic materials can be present in the form of sheetlike or filamentary structures and may have been processed for example into yarns or woven or knitted textile materials. The dyeing of the fibre material mentioned with the dye mixtures of the invention can be carried out in a conventional manner, preferably from aqueous dispersion, optionally in the presence of carriers, between 80 to about 110° C. by the exhaust method or by the HT method in a dyeing autoclave at 110 to 140° C., and also by the so-called thermofix method, whereby the fabric is padded with the dyeing liquor and then set/fixed at about 180 to 230° C. The printing of the materials mentioned can be carried out in a conventional manner by incorporating the dye mixtures of the invention into a print paste and treating the fabric printed therewith at temperatures between 180 to 230° C. with HT steam or dry heat to fix the dyes, optionally in the presence of a carrier. This produces very strong olive, navy or black dyeings and prints having very good fastnesses, especially having very good light, rub, dry heat setting and pleating, washing, water and sublimation fastness properties.

The dye mixtures of the invention exhibit excellent wetting characteristics when used for making up dyeing and padding liquors and also print pastes and are rapidly dispersible without extensive manual or mechanical stirring. The liquors and print pastes are homogeneous and give trouble-free processing in modern dyehouse drugstores without blocking the nozzles.

The liquid preparations of the invention do not separate and, in particular, do not form a sticky sediment. There is thus no need for any extensive homogenization of the dye in its container before the dye is removed.

The millbase produced on grinding the dyes in the presence of dispersants and auxiliaries to produce solid preparations is stable for a prolonged period, even at elevated temperature. The millbase need not be cooled in the mills or after leaving the mills and can be kept for a prolonged period in collection vessels prior to spray drying.

The thermal stability of the dye mixture of the invention also shows itself in the fact that spray drying can be carried out at high temperatures without agglomeration of the material to be dried. For the same dryer outlet temperature, a higher inlet temperature means better dryer performance and thus reduced manufacturing costs.

The above-described dye preparations are very useful for making up print pastes and dyeing liquors. They offer particular advantages for example in relation to continuous processes, where the dye concentration of the dyeing liquors has to be kept constant by continuously feeding dye into the running apparatus.

The advantage of the dye mixtures of the invention becomes particularly clear when dyeing from an aqueous dyebath under modern industrial conditions.

The modern industrial conditions mentioned are characterized by high pack densities in the case of package and beam dyeings, short liquor ratios, i.e. high dye concentrations, and also high shearing forces in the dyeing liquor due to high pumping rates. The dye mixtures of the invention do not agglomerate even under these conditions, nor filter out on the textile materials to be dyed. Thus, homogeneous dyeings are obtained without colour strength differences between the outer and inner layers of the wound packages, and the dyeings do not shed any dye deposits. Pad dyeings and prints with the dye mixture of the invention produce a material of homogeneous, speckle-free appearance.

The dye mixtures of the invention are also useful for dyeing the above-cited hydrophobic materials from organic solvents by the methods known for this purpose and for mass coloration.

The invention therefore also provides for the use of the dye mixtures of the invention for dyeing and printing hydrophobic synthetic materials, especially fibre materials, and for the mass coloration of hydrophobic synthetic materials.

The examples hereinbelow illustrate the invention.

EXAMPLES

Example 1 a) 13.3 g of the dye of the formula (1)

(1)

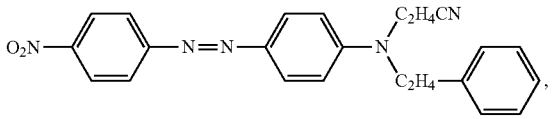

and 11 g of the dye of the formula (2)

(2)

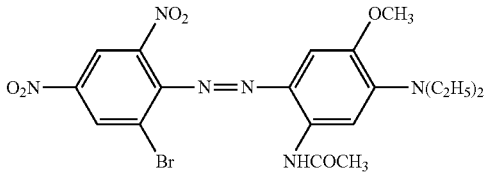

and also 13.7 g of the dye of the formula (3)

(3)

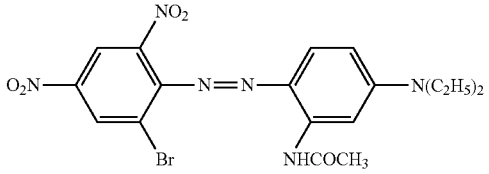

and 6.0 g of the dye of the formula (4)

(4)

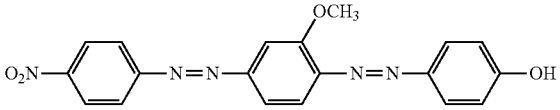

were ground together with 300 ml of water and 56 g of a ligninsulphonate (sodium salt) in a bead or sand mill for 3 hours and then spray dried (inlet temperature 130° C., outlet temperature 60° C.). The resulting powder (about 100 g) is readily dispersible in water.

b) 0.4 g of the above-prepared powder were treated together with 10 g of polyester textile material at pH 4.5 and 130° C. by a normal HT dyeing process for about 60 min. Washing, rinsing and drying left a jet black dyeing having very good fastness properties.

The method of Example 1 was followed to produce further dye mixtures and used them for polyester dyeing by using 13.3 g of the dye 1 of Example 1 and 11 g of the dye of the general formula (II) where the substituents are each as defined in Table 1.

TABLE 1

| | dye of formula (II) used | | | | |
|---|---|---|---|---|---|
| Ex. | X | $R^2$ | $R^5$ | $R^3$ | $R^4$ |
| 2 | Cl | $C_2H_5$ | $C_2H_5$ | $CH_2CH_2CN$ | $CH_2CH_2COOCH_3$ |
| 3 | Br | $CH_3$ | $CH_3$ | $CH_2CH_2$—$OCH_3$ | $CH_2CH_2$—$OCH_3$ |
| 4 | Br | $CH_3$ | $C_2H_5$ | $CH_2CH_2$—$OCOC_6H_5$ | $CH_2CH_2$—$OCOC_6H_5$ |
| 5 | Br | $CH_3$ | $CH_3$ | $CH_2CH_2$—$OCOCH_3$ | $CH_2CH_2$—$OCOCH_3$ |
| 6 | Br | $CH_3$ | $CH_3$ | $CH_2CH_2CN$ | $CH_2$—$C_6H_5$ |
| 7 | Cl | $CH_3$ | $C_2H_5$ | $CH_2CH_2CN$ | H |
| 8 | Br | $CH_3$ | $CH_3$ | $CH_2CH_2COOCH_3$ | $CH_2CH_2COOCH_3$ |

Example 9

The method of Example 1 was followed to grind 5 g of the dye of the formula (6)

(6)

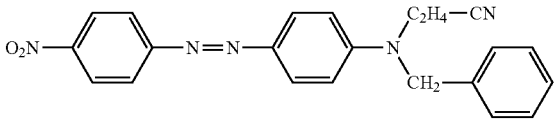

and 39 g of the dye of the formula (5)

(5)

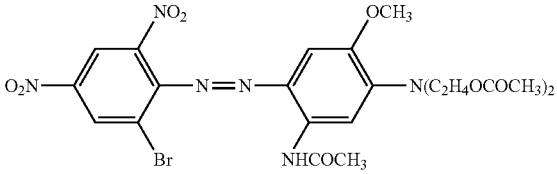

and dry the millbase. The ligninsulphonate (sodium salt) was used in the same ratio to the total amount of dye as in Example 1. The dye mixture obtained (0.1 g) was then used for dyeing 10 g of polyester fibres to obtain bright navy dyeings having good wash and sublimation fastness properties.

The method of Example 9 was repeated to combine the following dyes of the formulae I and II as per Table 2. The I:II weight ratio of Example 9 was maintained. Greenish to reddish navy dyeings were obtained.

TABLE 2

| Ex. | Dye of formula (I)* | Dye of formula (II) | | | | |
|---|---|---|---|---|---|---|
| No. | $R^1$ | X | $R^2$ | $R^5$ | $R^3$ | $R^4$ |
| 10 | H | Cl | $CH_3$ | $CH_3$ | $CH_2$—$CH_2OCOCH_3$ | $CH_2CH_2OCOCH_3$ |
| 11 | $CH_3$ | Cl | $C_2H_5$ | $CH_3$ | $CH_2CH_2OCOCH_3$ | $CH_2CH_2OCOCH_3$ |
| 12 | Cl | Br | $C_2H_5$ | $CH_3$ | $CH_2CH_2OCOCH_3$ | $CH_2CH_2OCOCH_3$ |
| 13 | H | Cl | $CH_3$ | $CH_3$ | $C_2H_5$ | $C_2H_5$ |
| 14 | H | Br | $CH_3$ | $CH_3$ | $C_2H_5$ | $C_2H_5$ |
| 15 | H | Cl | $CH_3$ | $CH_3$ | $CH_2$—CH═$CH_2$ | $CH_2$—CH═$CH_2$ |
| 16 | H | Br | $CH_3$ | $CH_3$ | $CH_2$—CH═$CH_2$ | $CH_2$—CH═$CH_2$ |
| 17 | $CH_3$ | Br | $CH_3$ | $CH_3$ | $CH_2$—CH═$CH_2$ | H |
| 18 | $CH_3$ | Cl | $CH_3$ | $CH_3$ | $CH_2$—CH═$CH_2$ | H |
| 19 | H | Br | $C_2H_5$ | $CH_3$ | $C_2H_5$ | $C_2H_5$ |
| 20 | H | Cl | $C_2H_5$ | $CH_3$ | $C_2H_5$ | $C_2H_5$ |
| 21 | $CH_3$ | Cl | $CH_3$ | $CH_3$ | $CH_2CH_2OCOC_2H_5$ | $CH_2CH_2OCOC_2H_5$ |
| 22 | H | Br | $CH_3$ | $CH_3$ | $CH_2CH_2OCOC_2H_5$ | $CH_2CH_2OCOC_2H_5$ |

*The ring A does not bear any further substituents; n = 1

Example 23

24 g of the dye of the formula (6) from Example 9 and 7 g of the dye of the formula (3) from Example 1 and also 22 g of the dye of the formula (5)

(5)

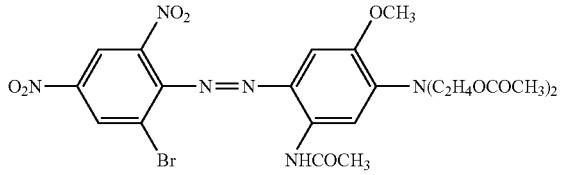

were ground together with 300 g of water and 53 g of sodium ligninsulphonate, and dried, similarly to Example 1.

When 0.35 g of this dye mixture is used for dyeing polyester fabric similarly to Example 1b, reddishly bloomy black dyeings are obtained.

When dye (5) of Example 23 was replaced by the same amount of a dye of the formula (II) as per Table 3 below, further reddish black dyeings having good fastness properties were obtained on polyester.

TABLE 3

| | Substituent meanings for the dye of the formula (II) | | | | |
|---|---|---|---|---|---|
| Ex. No. | X | $R^2$ | $R^5$ | $R^3$ | $R^4$ |
| 24 | Cl | $CH_3$ | $CH_3$ | $C_2H_4OCOCH_3$ | $C_2H_4OCOCH_3$ |
| 25 | Br | $C_2H_5$ | $CH_3$ | $C_2H_4OCOCH_3$ | $C_2H_4OCOCH_3$ |
| 26 | Cl | $C_2H_5$ | $CH_3$ | $C_2H_4OCOCH_3$ | $C_2H_4OCOCH_3$ |
| 27 | Br | $CH_3$ | $C_2H_5$ | $C_2H_4OCOCH_3$ | $C_2H_4OCOCH_3$ |
| 28 | Cl | $CH_3$ | $C_2H_5$ | $C_2H_4OCOCH_3$ | $C_2H_4OCOCH_3$ |
| 29 | Br | $CH_3$ | $CH_3$ | $C_2H_4OCOC_2H_5$ | $C_2H_4OCOC_2H_5$ |
| 30 | Cl | $CH_3$ | $CH_3$ | $C_2H_4OCOC_2H_5$ | $C_2H_4OCOC_2H_5$ |
| 31 | Cl | $CH_3$ | $CH_3$ | $C_2H_4COOCH_3$ | $C_2H_4COOCH_3$ |
| 32 | Br | $CH_3$ | $CH_3$ | $C_2H_4CN$ | $C_2H_4CN$ |
| 33 | Br | $CH_3$ | $CH_3$ | $C_2H_4OCH_3$ | $C_2H_4OCH_3$ |
| 34 | Cl | $CH_3$ | $CH_3$ | $C_2H_4CN$ | $CH_2C_6H_5$ |

Example 35

17.6 g of the dye of the formula (6) from Example 9, 9.4 g of the dye of the formula (2) from Example 1 and 11.0 g of dye (3) from Example 1 were ground together with 62 g of sodium ligninsulphonate and 300 g of water, and dried, similarly to Example 1.

0.6 g of the resulting powder was dyed together with 10 g of polyester fabric at pH 8.5 to 9 by means of a glycine/NaOH buffer at 130° C. for 60 min. A deep black textile material is obtained.

On replacing the dye of the formula (2) in Example 35 with the same amount of a dye of formula (II) of Table 4 below and using these mixtures to dye polyester similarly to Example 35, deep black dyeings were again obtained.

TABLE 4

| Dye components of the formula (II) used | | | | | |
|---|---|---|---|---|---|
| Ex. No. | X | $R^2$ | $R^5$ | $R^3$ | $R^4$ |
| 36 | Cl | $CH_3$ | $CH_3$ | $C_2H_5$ | $C_2H_5$ |
| 37 | Br | $C_2H_5$ | $CH_3$ | $C_2H_5$ | $C_2H_5$ |
| 38 | Cl | $C_2H_5$ | $CH_3$ | $C_2H_5$ | $C_2H_5$ |
| 39 | Cl | $CH_3$ | $CH_3$ | $CH_2—CH=CH_2$ | $CH_2—CH=CH_2$ |
| 40 | Br | $CH_3$ | $CH_3$ | $CH_2—CH=CH_2$ | $CH_2—CH=CH_2$ |
| 41 | Cl | $CH_3$ | $CH_3$ | $CH_2—CH=CH_2$ | H |
| 42 | Br | $CH_3$ | $CH_3$ | $CH_2—CH=CH_2$ | H |
| 43 | Cl | $C_2H_5$ | $CH_3$ | $CH_2—CH=CH_2$ | $CH_2—CH=CH_2$ |
| 44 | Br | $C_2H_5$ | $CH_3$ | $CH_2—CH=CH_2$ | $CH_2—CH=CH_2$ |
| 45 | Cl | $CH_3$ | $C_2H_5$ | $CH_2—CH=CH_2$ | $CH_2—CH=CH_2$ |
| 46 | Br | $CH_3$ | $C_2H_5$ | $CH_2—CH=CH_2$ | $CH_2—CH=CH_2$ |
| 47 | Cl | $CH_3$ | $C_2H_5$ | $C_2H_5$ | $C_2H_5$ |
| 48 | Br | $CH_3$ | $C_2H_5$ | $C_2H_5$ | $C_2H_5$ |

Example 49

The method of Example 1 was followed to dye polyester fabric with a dye mixture comprising 16.7 g of the dye of the formula (6) from Example 9, 6.1 g of the dye of the formula (7)

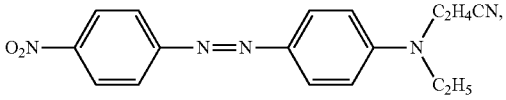

(7)

11.9 g of the dye of the formula (8)

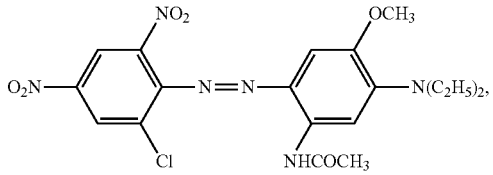

(8)

and 15.3 g of the dye of the formula (9)

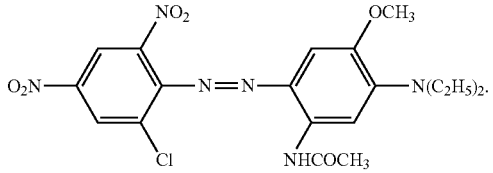

(9)

This mixture was bead milled in the presence of 50 g of sodium ligninsulphonate and 650 g of water and then spray dried.

0.1 g of this mixture was used for dyeing 5 g of polyester fabric. Black dyeings were obtained.

Examples 49 to 53

The method of Example 48 was followed to dye the mixtures of Table 5 below. In all cases, good pH dependence, excellent bath exhaustion and good sublimation fastness properties were obtained as results.

TABLE 5

| Dye I* | | | Dye II | | | | Dye III | | | |
|---|---|---|---|---|---|---|---|---|---|---|
| Ex. No. | R n 1 | Dye (7) from Ex. 49 | X | $R^2$ | $R^3=R^4$ | $R^5$ | $X^1$ | $X^2$ | $R^7=R^8$ | $R^6$ |
| 49 | 1 H | from Ex. 49 | Cl | $CH_3$ | $CH_2CH=CH_2CH_3$ | | Cl | $NO_2$ | $C_2H_5$ | $CH_3$ |
| 50 | 1 H | from Ex. 49 | Cl | $C_2H_5$ | $C_2H_5$ | $C_2H_5$ | Cl | $NO_2$ | $C_2H_5$ | $CH_3$ |
| 51 | 1 H | from Ex. 49 | Br | $CH_3$ | $C_2H_5$ | $CH_3$ | Br | $NO_2$ | $C_2H_5$ | $CH_3$ |
| 52 | 1 H | from Ex. 49 | Cl | $CH_3$ | $C_2H_5$ | $CH_3$ | Br | $NO_2$ | $C_2H_5$ | $CH_3$ |
| 53 | 1 H | from Ex. 49 | Br | $CH_3$ | $CH_2CH=CH_2CH_3$ | | Br | $NO_2$ | $C_2H_5$ | $CH_3$ |

*Ring A not further substituted

What is claimed is:

1. A mixture comprising *5 to 60% by weight of* at least one compound of the formula (I)

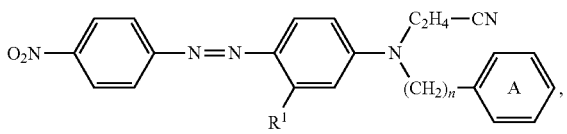

where $R^1$ is hydrogen, [$C_1$-$C_4$-alkyl, halogen, or $C_1$-$C_4$-alkoxy,]

n is 1 or 2, and the ring A is [optionally substituted] *unsubstituted*, and *20 to 95% by weight of* at least one compound of the formula (II)

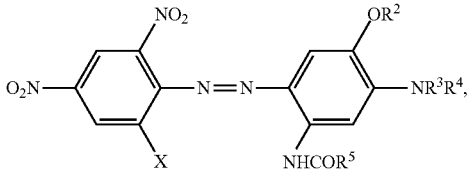

where X is halogen, [or CN,]

$R^2$ and $R^5$ are independently [hydrogen or] $C_1$-$C_4$-alkyl, and $R^3$ and $R^4$ are independently [hydrogen, optionally substituted $C_1$-$C_4$-alkyl or] $C_2$-$C_4$-alkenyl *or unsubstituted $C_1$-$C_4$-alkyl,*

*based on total amount of dye in the mixture.*

[2. The mixture of claim 1, comprising at least one compound of the formula (I) where the ring A does not bear any further substituents.]

[3. The mixture of claim 1, comprising at least one compound of the formula (I) where $R^1$ is hydrogen or $C_1$-$C_4$-alkyl.]

4. The mixture of claim 1, comprising at least one compound of the formula (I), where n is 1[, $R^1$ is hydrogen or methyl and the ring A is not further substituted].

[5. The mixture of claim 1, comprising compounds of the formula (II) where X is halogen.]

[6. The mixture of claim 1, comprising compounds of the formula (II) where $R^3$ and $R^4$ are independently hydrogen, $C_2$-$C_4$-alkenyl, unsubstituted $C_1$-$C_4$-alkyl or ROCO—, NC— and/or ROOC-substituted $C_1$-$C_4$-alkyl, R being hydrogen or $C_1$-$C_4$-alkyl.]

7. The mixture of claim 1, *further* comprising a compound of the formula (III), (IV) and/or (V)

(III)

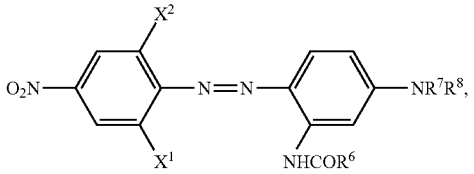

(IV)

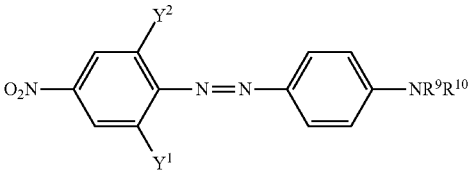

and/or

-continued (V)

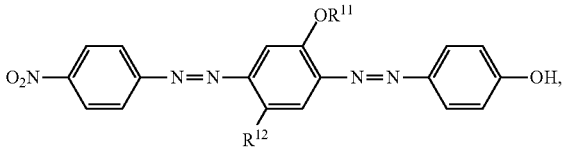

where $X^1$ is halogen or CN, $X^2$ is halogen, hydrogen, $NO_2$ or CN, $R^6$ is $C_1$-$C_4$-alkyl, $R^7$ and $R^8$ are independently hydrogen, unsubstituted or HO—, NC—, ROCO—, $H_5C_6OCO$—, ($C_1$-$C_4$-alkyl)OOCO—, ROOC—, $H_5C_6O$—, $H_5C_6$— and/or $C_1$-$C_4$-alkoxy-substituted $C_1$-$C_4$-alkyl and/or $C_2$-$C_4$-alkenyl, R being hydrogen or $C_1$-$C_4$-alkyl, $Y^1$ and $Y^2$ are independently hydrogen or halogen, $R^9$ and $R^{10}$ are independently hydrogen, unsubstituted or HO—, NC—, ROCO—, $H_5C_6OCO$— and/or $C_1$-$C_4$-alkoxy-substituted $C_1$-$C_4$-alkyl, R being as defined above, or $C_2$-$C_4$-alkenyl, $R^{11}$ is $C_1$-$C_4$-alkyl, and $R^{12}$ is hydrogen, $C_1$-$C_4$-alkyl or $C_1$-$C_4$-alkoxy.

[8. The mixtures of claim 1, comprising 1 to 99% by weight, especially 1 to 80% by weight, of at least one compound of the formula (I) and 1 to 99% by weight, especially 20 to 99% by weight, of at least one compound of the formula (II), based on total amount of dye.]

9. A dye preparation comprising 10 to 60% by weight of dye mixture according to claim 1, and 40 to 90% by weight of dispersant.

10. A process for producing the dye preparation of [claim 8] *claim 9*, in which the individual dyes of the dye mixture of claim 1 are ground in water in the presence of a dispersant, then mixed and optionally dried or in which the dye mixture of claim 1 is ground in water in the presence of a dispersant and optionally dried.

11. A method for dyeing and printing hydrophobic synthetic materials or for mass coloration of hydrophobic synthetic materials in which the dye mixture of claim 1 is used.

12. [The] *A* hydrophobic synthetic material dyed or printed with the dye mixture of claim 1.

*13. The mixture of claim 1, further comprising 2 to 60% by weight of at least one compound of the formula (III), based on the total amount of dye in the mixture,*

(III)

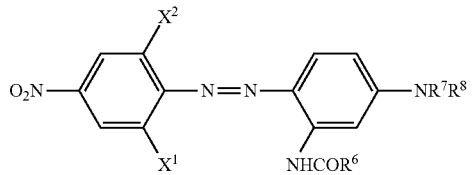

*$X^1$ is halogen,*

*$X^2$ is halogen, hydrogen, $NO_2$ or CN,*

*$R^6$, $R^7$ and $R^8$ are independently $C_1$-$C_4$-alkyl.*

*14. A process for producing the dye preparation of claim 9, in which the individual dyes of the dye mixture are ground in water in the presence of a dispersant, then mixed and optionally dried or in which the dye mixture is ground in water in the*

*presence of a dispersant and optionally dried wherein the mixture comprises 5 to 60% by weight of at least one compound of the formula (I) and 20 to 95% by weight of at least one compound of the formula (II), based on total amount of dye.*

* * * * *